F. G. HELD.
LITTER CARRIER.
APPLICATION FILED APR. 20, 1908.
906,798.
Patented Dec. 15, 1908.
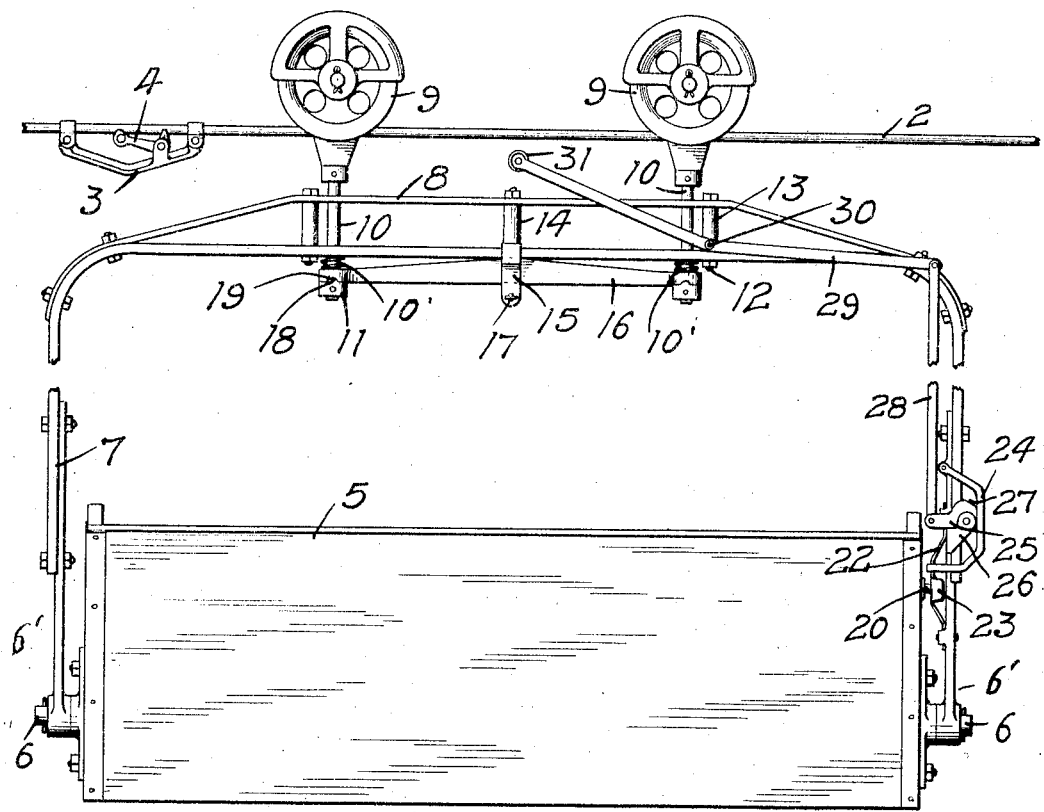
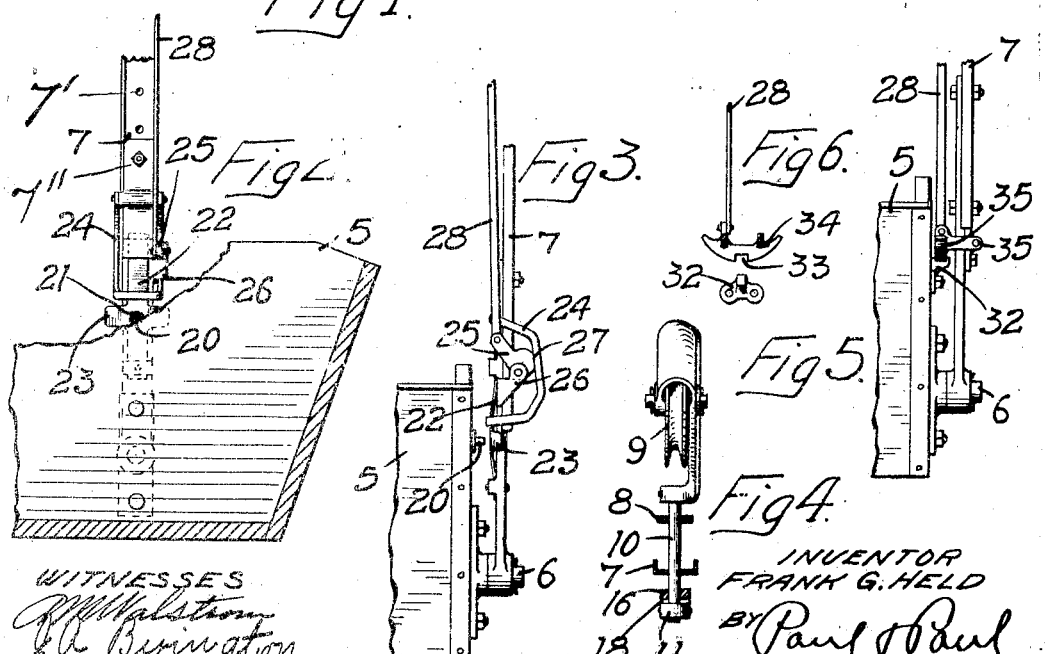
WITNESSES
INVENTOR
FRANK G. HELD
BY Paul & Paul
HIS ATTORNEYS

UNITED STATES PATENT OFFICE.

FRANK G. HELD, OF KENYON, MINNESOTA.

LITTER-CARRIER.

No. 906,798.  Specification of Letters Patent.  Patented Dec. 15, 1908.

Application filed April 20, 1908. Serial No. 428,024.

*To all whom it may concern:*

Be it known that I, FRANK G. HELD, of Kenyon, Goodhue county, Minnesota, have invented certain new and useful Improvements in Litter-Carriers, of which the following is a specification.

The object of my invention is to provide a carrier adapted to run on a cable and designed for transporting stable manure and refuse from the stable to a distant dumping point.

A further object is to provide means whereby all danger of the carrier wheels jumping the cable through oscillation or vibration, is prevented.

The invention consists generally in various constructions and combinations, all as hereinafter described and particularly pointed out in the claims.

In the accompanying drawings, forming part of this specification, Figure 1 is a side elevation of a litter carrier embodying my invention. Fig. 2 is a detail sectional view illustrating the locking mechanism. Fig. 3 is a detail view of the lock or latch mechanism showing the position of the parts when the carrier is released. Fig. 4 is a detail sectional view showing the manner of supporting the carrier on the wheel hangers. Fig. 5 is a detail view illustrating a modified form of locking latch. Fig. 6 is a detail sectional view of the same.

In the drawing, 2 represents a cable upon which the carrier is suspended. The trip 3 is adjustable on the cable by means of a cam lever 4. In the position shown in Fig. 1 the trip is locked on the cable, but by swinging the cam lever downward it will release its grip on the cable and the trip may be moved to some other point thereon. 5 represents the carrier or bucket having gudgeons 6 that are journaled in bars 6' that are adjustably connected with the ends of a bail 7 by means of holes 7' and bolts 7''. This bail is provided with a truss strap 8 and carrier wheels 9 are adapted to rest on the cable 2 and have hanger spindles 10 that are movable within holes in the strap 8 and the bail 7 and are provided at their lower ends with collars 11. The strap 8 and the bail are connected with one another by a series of bolts 12 and are held in parallel relation by sleeves 13 and 14. A fork 15 is carried by one of said bolts and straddles the middle of the bail and a rocker or equalizing bar 16 that is provided with a convex upper edge to bear on the center of the bail and has holes in its ends to receive the spindles 10.

The rocker bar has a limited vertical movement and is guided in the fork 15 between the bail and a pin 17 mounted in the lower end of the fork. The bail is adapted to rock on said bar and accommodate itself to the oscillations or vibrations of the carrier without danger of disturbing the wheels in their travel on the cable. Generally in devices of this kind any jerk or sudden shock to the carrier, as in starting or stopping it, will be communicated to the wheels and cause them to jump the cable. With the mechanism heretofore described, however, all danger of this kind is avoided. The collars 11 are provided with ribs 18 that are adapted to enter recesses 19 in the ends of the rocker bar. This is to hold the wheels in line when running on a straight track and to allow a slight rotary movement of the wheels and spindles, as in rounding a curve or on a switch, and permitting the wheels to follow such curve without unnecessary friction and danger of leaving the cable. The carrier is mounted to dump automatically when released, and for the purpose of locking it in position to receive its load I provide a pin 20 on one end of the carrier adapted to snap into a hole 21 provided in a spring plate 22 that is secured to one end of the bail 7 above its pivot. This plate has arms 23 that act as guides to engage the pin 20 and direct it into the hole 21. A curved lever 24 is pivoted on the bail and has an arm to extend across and bear on the spring plate 22 so that when pressure is applied to said lever the spring plate will be flattened as indicated in Fig. 3, and disengaged from the pin 20, whereupon the carrier will automatically dump itself.

For the purpose of operating the lever 24 I provide a cam lever 25 pivoted on a bracket 26 and having a flat face 27 that is adapted to contact with the lever 24 and lock it in position to hold the spring plate out of engagement with the locking pin 20. The cam lever 25 is operated by means of a link 28 that is connected to one end of a lever 29 pivoted at 30 on the bail 7 and having an anti-friction roller 31 in position to engage the trip 3 at a predetermined point on the cable. When the cam lever is tilted its flat surface will be held in engagement with the lever 24 and the spring plate will be held out of the path of the locking pin.

In Fig. 5 I have shown a modification which consists in providing a latch plate 32 in one end of the carrier adapted to enter a notch 33 in a lever 34 that is pivoted at 35 on one end of the bail. This lever normally is held by gravity in the path of the latch 32. Its connection with the lever 29 is the same as shown in Fig. 1.

In the operation of the device the bucket being swung into position to receive its load is locked by the engagement of the pin 20 with the spring plate and when the bucket is filled the operator pushes the carrier out on the elevated track. The trip device 3 is locked at the desired point on the track and the anti-friction roller 31 coming in contact therewith will cause the lever 29 to be oscillated to tilt the cam lever 25 and swing the lever 24 outwardly to disengage the spring plate from the locking pin, whereupon the bucket will swing bottom side up with the weight of the load and discharge its contents. By providing the equalizing bar arrangement I am able to direct the carrier around the curves and on switches without danger of the wheels leaving the track.

As illustrated in Fig. 1, I may mount springs 10' on the spindles 10 between the rocker bar 16 and the bail. These springs yieldingly resist the operation of the bar. These springs may be made of any degree of stiffness and in place of them I may substitute sleeves or collars which will hold the rocker bar rigid and prevent its oscillation. The use of these sleeves being so obvious I have thought detailed illustration unnecessary as the device with the sleeves would be in effect a rigid carrier head.

I claim as my invention:—

1. The combination, with an elevated track, of a carrier bucket, a bail therefor, hangers having wheels adapted to travel on said track, and spindles loosely connected with said bail, and an equalizing bar having a central rocker bearing on said bail and connected on each side of said bearing with said spindles, for the purpose specified.

2. The combination, with an elevated track, of a carrier bucket, a bail therefor, a truss strap secured to said bail, hangers having wheels adapted to travel on said track and depending spindles fitting loosely within holes in said bail and said strap, an equalizing bar having a central rocker bearing on said bail and connected at its ends to said spindles.

3. The combination, with a litter carrier bucket, of a bail therefor, hangers having wheels and depending spindles loosely mounted in said bail, a fork mounted on said bail, a rocker bar arranged to bear on said bail and having a vertical movement in said fork, a pin carried by said fork for limiting the movement of said bar, and the ends of said bar having a loose connection with said spindles, for the purpose specified.

4. The combination, with an elevated track, of a carrier bucket and a bail therefor, hangers having wheels adapted to travel on said track and spindles fitting within holes in said bail, a bar having holes in its ends to receive said spindles, and collars secured on said spindles and having ribs to enter recesses in the ends of said bar, and said spindles being capable of rotation in said bar to accommodate the wheels to curves in the track.

5. The combination, with an elevated track, of a carrier bucket, a bail therefor, hangers having wheels and spindles loosely mounted in said bail, said spindles being capable of rotation to accommodate the wheels to curves in the track, and means for normally holding said wheels in line when traveling on a straight track.

6. In a litter carrier, the combination with a bucket having gudgeons at its ends and arms pivoted thereon, of a bail, having ends formed of channel bar and provided with a series of holes therein at intervals, said channel bar ends being adapted to receive said arms and bolts passing through the holes in said bail and through said arms and adjustably securing them together, substantially as described.

7. In a litter carrier, the combination, with a bucket, of a bail pivoted thereon, a locking pin, a spring plate mounted on said bail and having a hole to receive said pin and normally lock said bucket in position to receive its load, a lever pivoted on said spring plate, and a cam lever carried by said bail and adapted to engage said first named lever and force it outwardly to disengage said spring plate from said pin, an elevated track, a trip device thereon and means arranged to be actuated by said trip device for tilting said cam lever.

8. In a litter carrier, the combination, with a bucket, of a bail pivoted thereon, a locking pin carried by said bucket, a spring plate mounted on said bail and having an opening to receive said pin, a lever carried by said bail and adapted to disengage said spring plate from said pin, a cam lever pivoted on said bail, and having a flattened surface to engage said first named lever and hold it and said spring plate in their disengaged position when said cam lever is tilted, and a rocking lever carried by said bail and connected with said cam lever.

9. In a litter carrier, a bucket and bail therefor, carrier wheels having spindles loosely connected with said bail and an equalizing bar attached to said spindles and having a rocker bearing.

10. In a litter carrier, a bucket and bail therefor, carrier wheels having spindles loosely connected with said bail, an equalizing bar attached to said spindles and having a rocking bearing on said bail, and spring devices interposed between the said bar and said bail, for the purpose specified.

11. In a litter carrier, the combination with a bucket and a bail pivoted thereon, a locking pin carried by said bucket, a spring plate mounted on said bail and having an opening to receive said pin, a lever carried by said bail and adapted to disengage said spring plate from said pin, means mounted on said bail and adapted to engage said lever and hold it and said spring plate in a disengaged position, and means for actuating said holding means.

In witness whereof, I have hereunto set my hand this 10th day of April 1908.

FRANK G. HELD.

Witnesses:
E. O. BAKKO,
G. H. EDSTROM.